Sept. 14, 1948.  A. F. PITYO ET AL  2,449,505
MACHINE FOR PRODUCING CATHODE
SLEEVES FOR THERMIONIC VALVES
Filed March 14, 1946  4 Sheets-Sheet 1

INVENTORS
Albert F. Pityo
Harry Butterfield
Samuel W. Warner
Attorney

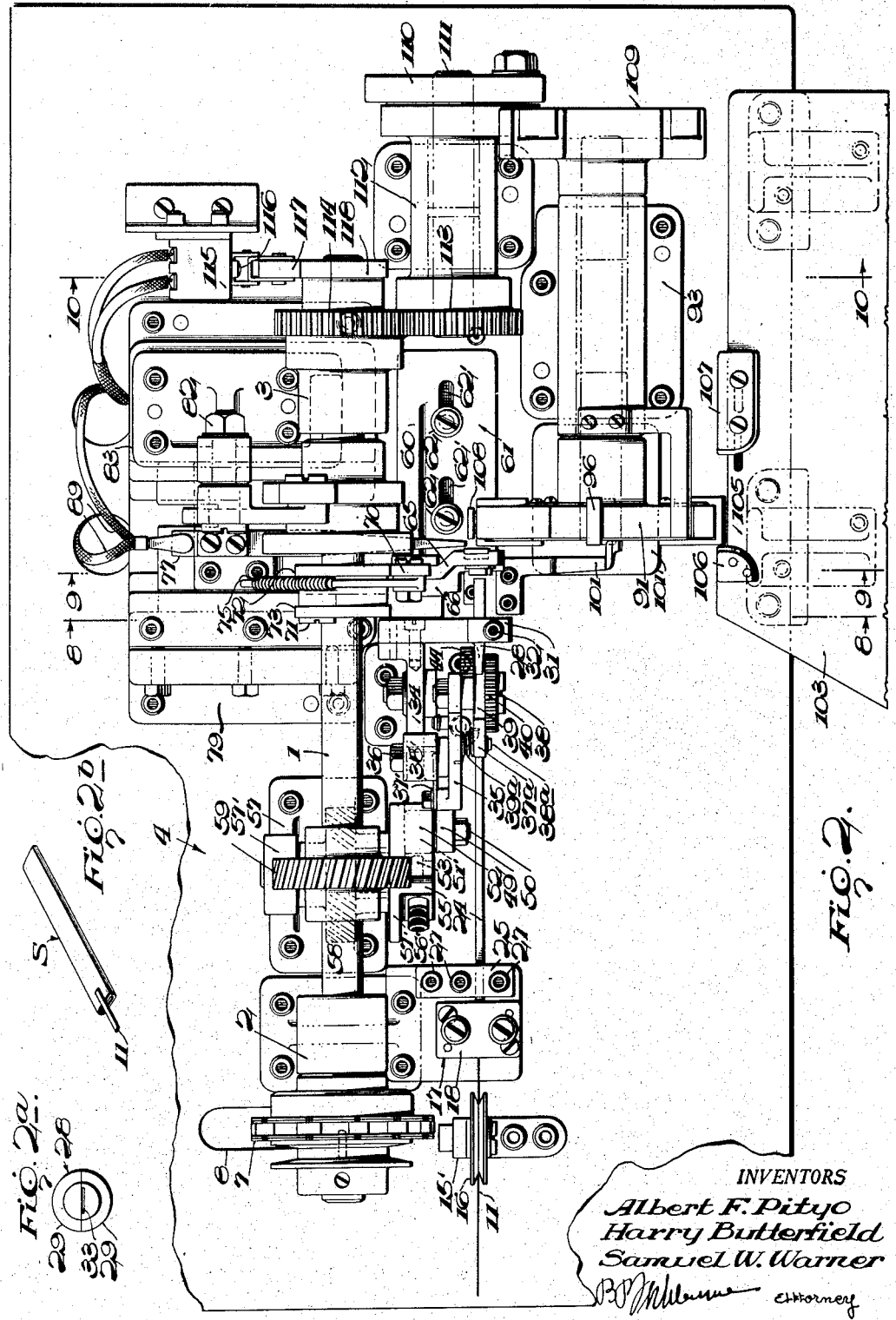

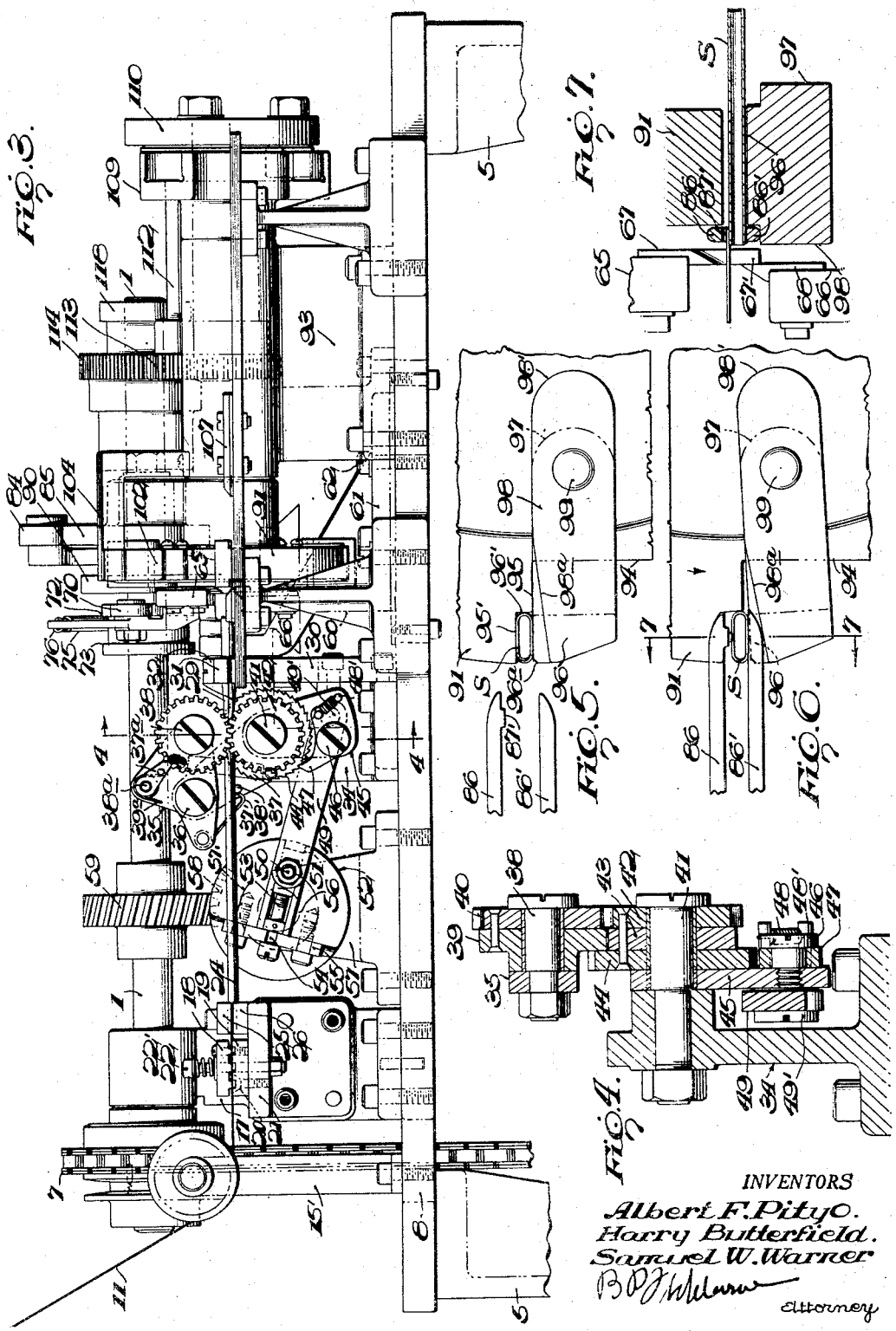

INVENTORS
Albert E. Pityo
Harry Butterfield
Samuel W. Warner

Patented Sept. 14, 1948

2,449,505

UNITED STATES PATENT OFFICE 2,449,505

MACHINE FOR PRODUCING CATHODE SLEEVES FOR THERMIONIC VALVES

Albert F. Pityo, Clifton, Harry Butterfield, Maplewood, and Samuel W. Warner, Newark, N. J., assignors to Tweezer-Weld Corporation, Newark, N. J., a corporation of New Jersey Application March 14, 1946, Serial No. 654,324

29 Claims. (Cl. 219—4)

1

Our invention relates to a machine for producing cathode sleeves for thermionic valves, while not necessarily restricted to this use.

An important object of the invention is to provide a machine of the above mentioned character for welding tabs to the sleeves of thermionic valves.

A further object of the invention is to provide a machine of the above mentioned character which will effect the proper welding between the sleeve and tab without collapsing the sleeve.

A further object of the invention is to provide means to move resilient welding jaws together for clamping the tab to the sleeve, and during the welding step produce a continued pressure upon one jaw so that the pressure follows through during the welding period, both jaws yielding before the pressure is sufficient to collapse the sleeve.

A further object of the invention is to provide a machine which is automatic in operation and will handle a continuous strand of wire, advance the same for a step of a given length, move the free end of the wire adjacent to the sleeve, clamp the wire to the sleeve, sever the wire, weld the wire to the sleeve while being clamped to the same, and then discharge the completed product.

A further object of the invention is to provide a machine of the above mentioned character which is accurate and reliable in operation.

Other objects and advantages of the invention will be apparent during the course of the following description.

Figure 1:
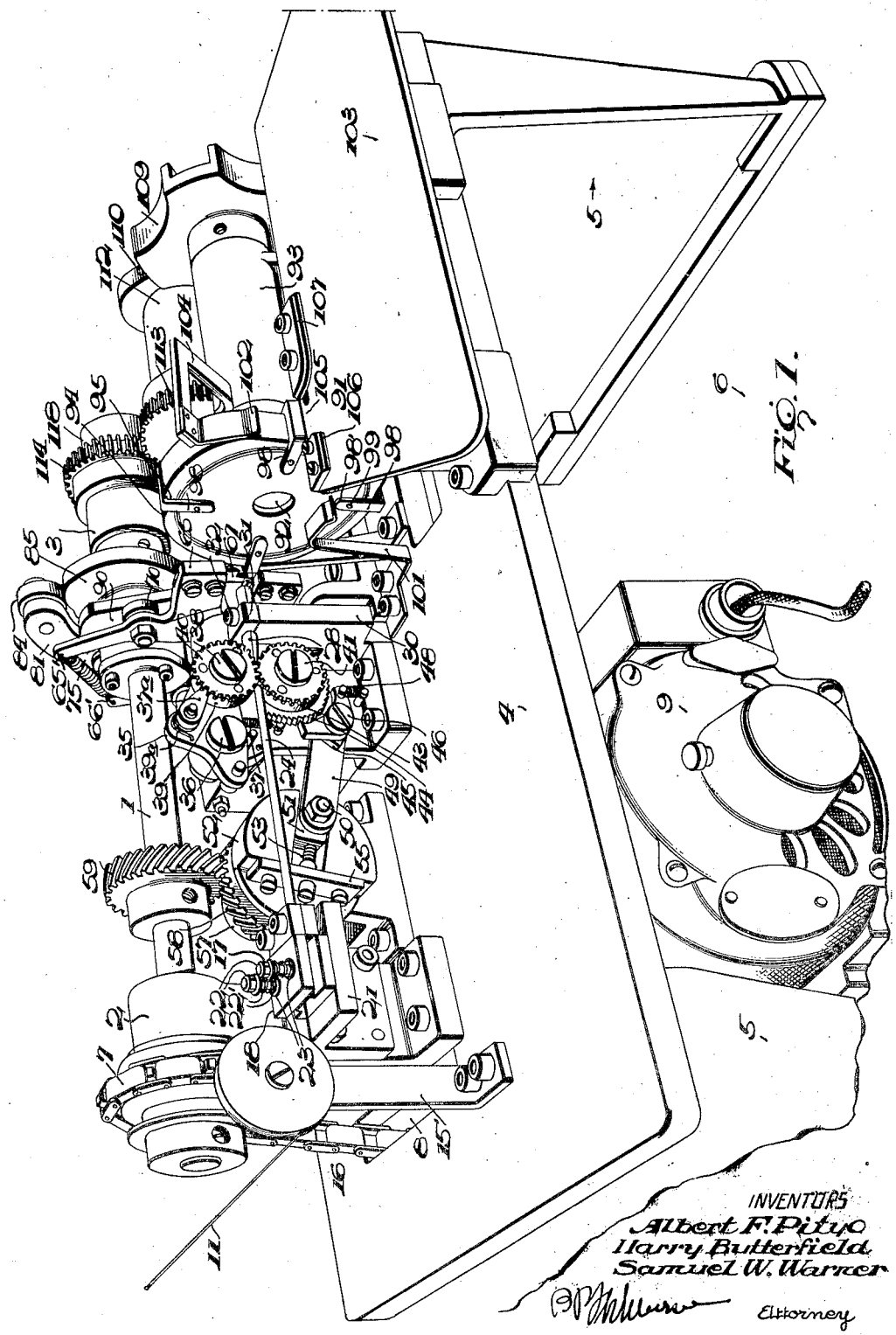
Figure 8:
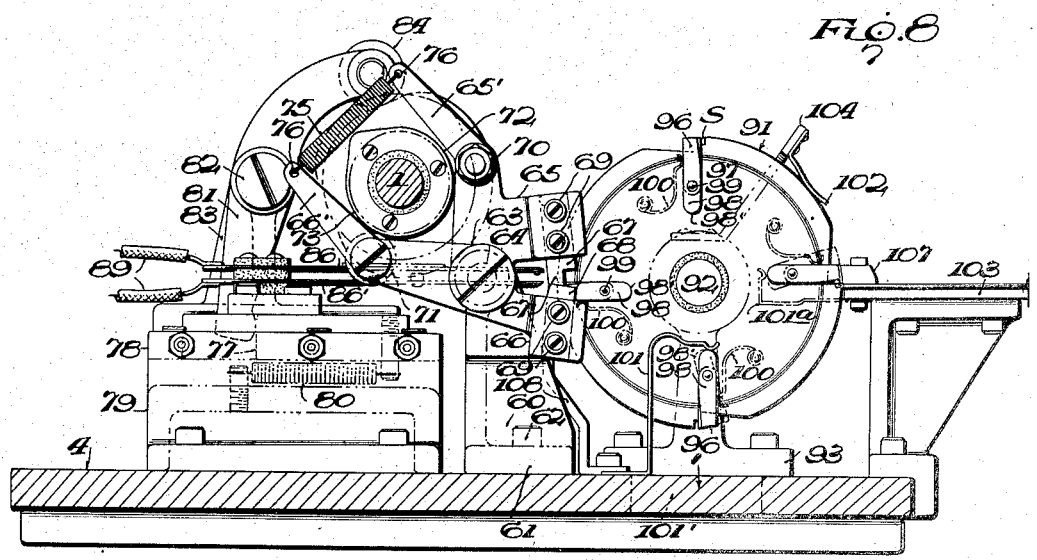
Figure 9:
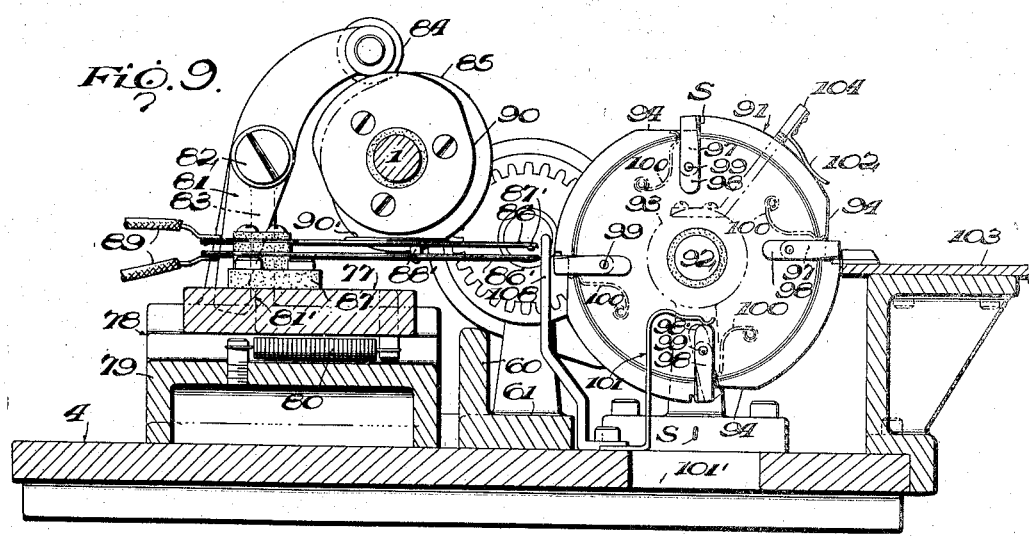
Figure 10:
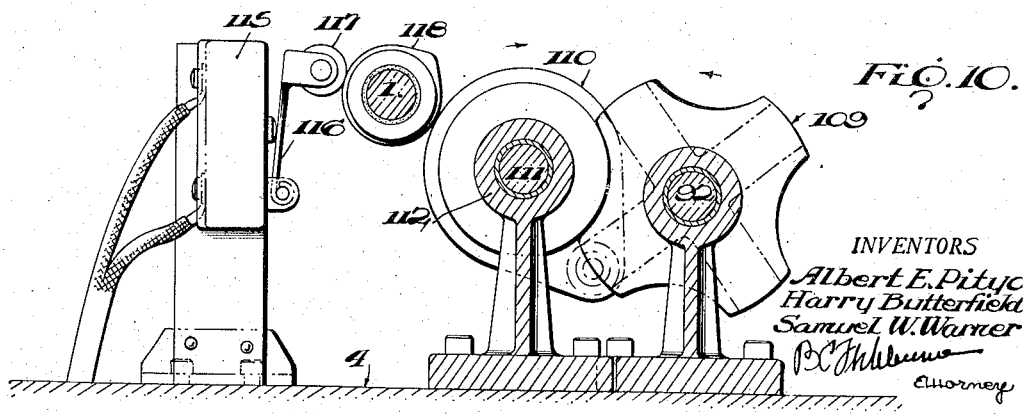

In the accompanying drawings, forming a part of this application and in which like numerals are employed to designate like parts throughout the same, Figure 1 is a perspective view of a machine embodying our invention, Figure 2 is a plan view of the same, Figure 3 is a front side elevation of the machine, Figure 4 is a vertical section taken on line 4—4 of Figure 3, Figure 5 is a fragmentary end elevation of the turret and associated elements, the sleeve holding device being in the raised or clamping position, and the welding jaws in the rear position, Figure 6 is a similar view showing the welding jaws moved forwardly, and the sleeve holding device swung downwardly, Figure 7 is a vertical section taken on line 7—7 of Figure 6, Figure 8 is a transverse vertical section taken on line 8—8 of Figure 2, Figure 9 is a similar view taken on line 9—9 of Figure 2, Figure 10 is a similar view taken on line 10—10 of Figure 2, Figure 2ª is an end elevation of the guide tube, and,

2

Figure 2ᵇ is a perspective view of the completed sleeve.

In the drawings, wherein for the purpose of illustration is shown a preferred embodiment of our invention, the numeral 1 designates a main drive shaft, which is horizontal and is journaled in fixed bearings 2 and 3, rigidly secured upon a table top 4, in turn rigidly mounted upon ends or legs 5. These ends or legs are rigidly mounted upon a horizontal support 6, Figure 1. The shaft 1 is driven by gearing 7, including a sprocket chain, extending downwardly through an opening 8, and driven by a motor 9.

The numeral 11 designates a wire which may be in the form of a continuous flat strand. Rigidly mounted upon the table top 4, is a vertical arm 15', carrying a vertical grooved pulley 16. The wire 11 is paid out from a spool, not shown, and passes under the guide pulley 16.

The numeral 17 designates a wire straightening device, Figures 1, 2 and 3, including upper and lower horizontal plates 18 and 19, provided upon their inner faces with spaced ribs 20, arranged in staggered relation. The lower plate 19 is rigidly mounted upon a fixed bracket 21, as shown. The plate 18 is drawn down toward the plate 19 by adjustable means including bolts 22. The ribs 20 extend transversely of the travel of the wire 11, and the wire passes between or over these ribs and is straightened or its tendency to coil is removed. If desired, the bolts 22 may be equipped with springs 22'. The plates 18 and 19 are preferably formed of fiber or "Bakelite."

Arranged in advance of the wire straightening device 17 is a stationary wire guide tube 24, which is horizontal, and its intake end is clamped between upper and lower blocks 24 and 26, secured to the bracket 21 by bolts 27. The intake end of the tube 24 is adjacent to the wire straightening device 17, and the wire enters the tube 24 when discharging from the device 17. Arranged near and spaced from the outlet end of the horizontal guide tube 24 is a horizontal stationary tubular wire guide 28, see more particularly Figures 1, 2 and 2ª, formed in upper and lower longitudinal sections 29. This tubular guide 28 is rigidly detachably held in a vertical holder 30, having a removeable cap 31, held in place by bolts 32 or the like. The opening or bore 33 of the guide 28 is rectangular in cross-section, corresponding to the shape of the wire, and is formed in the lower section 29.

The numeral 34 indicates a vertical bracket, fixed upon the table top 4. A vertically swinging arm 35 is pivotally mounted upon the upper end of the bracket 34, as shown at 36, and the arm 35 is swung downwardly by a spring 37. The arm 35, Figure 3, carries a latch 37', to detachably engage a pin 38', fixed to the bracket 34. When the latch 37' has holding engagement with the pin 38', the arm 35 is held in the raised position, so that the wire may be threaded through the machine, manually. The arm 35, Figures 3 and 4, is provided near its forward end with a shaft or pivot 38, rigidly secured thereto, and an upper feed roller 39 and gear 40 are rigidly connected with each other to turn as a unit, and are rotatable upon the shaft 38. Arranged beneath the shaft 38 is a shaft 41, rigidly secured to the fixed bracket 34. Rotatably mounted upon the shaft 41, is a unit, including a gear 42, a roller 43 and ratchet-wheel 44, rigidly connected to turn as a unit. The gear 42 is arranged to mesh with the gear 40, while roller 43 will engage roller 39, or the wire held between them. The roller 39 has its periphery terminating near the radial centers of the teeth of the gear 40, while the roller 43 has its periphery terminating near the radial centers of the teeth of the gear 42. These gear teeth are sufficiently long whereby the gears 40 and 42 remain in mesh when the rollers 39 and 43 are spaced, to receive and engage the wire between them. The rollers engage and positively feed the wire. The tube 24 and tubular guide 28, have their ends spaced, and the rollers 39 and 43 project into this space, Figures 3 and 4. A check or finger 37a, is pivoted upon the arm 35, at 38a, and is pressed into engagement with the roller 39 by a spring 39a. The check 37a holds the roller against turning clockwise, Figure 1, but this roller is free to turn counter-clockwise. A depending lever or arm 45 is pivoted upon the shaft 41, next to the ratchet-wheel 44, Figure 4, and the lever 45 is provided at its free end with a pivot 46, carrying a pawl 47, swung into engagement with the ratchet-wheel 44 by a spring 48. One end of this spring is attached to the pawl 47, while its opposite end is attached to a pin 48', carried by the lever 45. A connecting rod or link 49 is connected with a pivot 49', secured to the lever 45, near its rear end and engages a pivot 50. The pivot 50 is carried by a block 51, secured to a disc or cylinder 52, and radially adjustable thereon. This block has a screw threaded opening for receiving the screw threaded portion of a radial shaft 53, having a smooth portion 54, having a swiveled connection within a notch formed in a plate 55, attached to a flat of the disc 52. The disc 52 rotates in a vertical plane, and will operate the connecting rod or link 49, which will swing the lever 45, in turn causing the pawl 47 to advance the ratchet-wheel 44. The ratchet-wheel is given a step-by-step movement, and the length of each step may be regulated by adjusting the block 51. The ratchet-wheel 44 turns the rollers 39 and 43, which travel in opposite directions. The disc or wheel 52 is rigidly mounted upon a horizontal transverse shaft 56, Figures 2 and 3, rotatable within bearings 57' formed upon a vertical bracket 57, fixed to the table top 4. The shaft 56 has a helical gear 58, rigidly mounted thereon, engaging a helical gear 59, rigidly mounted upon the main drive shaft 1.

Mechanism is provided to sever the wire. This severing mechanism includes a bracket 60 having a base 61, Figures 2 and 8, horizontally adjustable upon the table top 4 and clamped thereto by set screws 62, extending through slots 62'. This bracket has an apertured knuckle 63, receiving a pivot 64, upon which are pivotally mounted vertically swinging arms 65 and 66 having tails 65' and 66'. These arms carry upper and lower blades 67 and 68. The upper blade has a depending projection 67' which overlaps the face of the lower blade 68, Figure 7. The blades are held upon the arms by screws 69, so that the cutting edges of the blades have a proper shearing action. The arm 65 carries a roller 70 and the arm 66 carries a roller 71. The roller 70 is arranged to engage a cam 72 and the roller 71 engages a cam 73. These cams are connected to form a unit and are keyed upon the main drive shaft 1, to be longitudinally adjusted thereon and clamped to the drive shaft by a set screw or the like. The arms 65 and 66 do not cross, and the cams 72 and 73 move the blade carrying ends of these arms inwardly to cause the blades to sever the wire, while the blade carrying ends of the arms are moved outwardly by a retractile coil spring 75, attached to the free ends of the tails 65' and 66', as shown at 76.

The welding mechanism includes a slide or carriage 77, Figure 9, arranged beneath the drive shaft 1 and moveable transversely thereof. This slide or carriage operates within a fixed guide 78, formed in a stationary block 79, mounted upon the table top 4. The slide is pulled rearwardly by a spring 80, attached to the slide and the block 79, as shown. The slide 77, Figure 9, is shifted forwardly by an upstanding vertically swinging lever 81, pivoted at 82, upon a stationary bracket 83. The lower end of this lever engages the slide at 81', while its upper end carries a roller 84, engaging a cam 85, rigidly mounted upon the main drive shaft 1. A pair of resilient blades or jaws 86 and 86', Figures 5, 6, and 9 forming in effect a pair of tweezers, are insulated from each other and mounted upon an insulating block 87, in turn rigidly mounted upon the slide 77. The resilient welding blades or jaws 86 and 86' are preferably formed of copper or the like, and are biased to assume an open parallel position, the rear ends of these blades being rigidly connected and insulated. The rear ends of these blades are connected with wires 89, included in the welding circuit. At its forward end, the welding blade 86 has a welding point 87', and the welding blade 86' carries an insulating stop 88'. This insulating stop prevents the point 87' contacting with the blade 86' when the sleeve is not between these blades, but does not prevent the blades from closing sufficiently to engage the sleeve and wire, and press them into firm engagement. Arranged near and above the blades 86 and 86' is a cam 90, formed of fiber or other suitable material and this cam engages a wear strip 90', rigidly mounted upon the upper blade 86. The cam 90 is mounted upon the shaft 1 for rotation therewith, and forces the upper blade 86 downwardly, causing the point 87' to engage the wire and clamp the wire to the sleeve and then moving the closed blades 86 and 86' downwardly as a unit, Figure 6.

Arranged in cooperative relation to the guide 28 and cutting mechanism, is a turret 91, mounted to turn in a vertical plane, transversely of the shaft 1. This turret is arranged at an elevation below the shaft 1, and is spaced from this shaft, and has its periphery travelling near the wire guide 28. The turret 90 is rigidly mounted upon a shaft 92, journaled in a fixed horizontal bearing 93, in turn mounted upon the table top 4. The turret 91 serves to hold and feed the sleeves. This turret has a plurality of sleeve holding devices which are circumferentially spaced. Four of these devices are shown for the purpose of illustration. To form each holding device, the turret has its periphery cut away to provide a flat 94, Figures 5, 6 and 9, and a radial shoulder 95. This shoulder 95 has a radial recess formed therein to receive the sleeve S. This recess forms a stationary jaw 95' and a shoulder 96'.

The stationary jaw 95' coacts with a swinging jaw 96, carried by radial arms 97 and 98, disposed upon opposite sides of the turret 91, and pivoted thereto at 99. The jaw 96 has a beveled edge 96a to facilitate the insertion of the sleeve between the jaws 96 and 95'. The jaw 96 is moved to the closed position by a spring 100, attached to the turret 91 and engaging the arm 97, upon the edge thereof remote from the jaw 96. The jaw 96 is opened when the tail 98' of the arm 98 engages a trip 101 to discharge the sleeve S through an opening 101'. A trip 101a, shown in dotted lines in Figure 8 may be provided to open the jaw 96 at the loading position, but this trip may be omitted. A spring wiper 102 is arranged near and above the feed table 103. This spring wiper is carried by a stationary bracket 104, attached to the bearing 93. The radially outer face of the jaw 96 is within the circumference of the turret 91 and passes beneath the spring wiper, and the spring wiper will serve to complete the insertion of the sleeve between the jaws 95' and 96, if necessary. The sleeves are fed between the jaws 95' and 96 from a table 103, and this table is provided with a sleeve guide passage 105, formed between guides 106 and 107, and the guide 107 is adjustable. These guides cause the sleeve to pass between the jaws 95' and 96 and project beyond the ends of the jaw 96, Figure 7. The numeral 108 designates a stripper, the free end of which is arranged to substantially slideably contact with the periphery of the turret. This stripper is upon one side of the welding jaws 86 and 86' and out of the path of travel of the same. The sleeve S held by the jaws 95' and 96 moves across the stripper. This stripper prevents the jaws 86 and 86' from displacing the sleeve from between the jaws 95' and 96 when the jaws 86 and 86' are retracted. The turret 91 is rigidly mounted upon the shaft 92, as stated, and this shaft is intermittently turned by a Geneva movement, including coacting elements 109 and 110. The element 109 is rigidly mounted upon the shaft 92, while the element 110 is rigidly mounted upon a counter shaft 111. This is the conventional Geneva movement, and it will turn the shaft 92 a step and then produce a dwell and lock the shaft 92 against turning movement during the dwell. The shaft is turned one fourth of a revolution for each complete revolution of the shaft 1. The shaft 111 is mounted in a stationary bearing 112, and the shaft 111 carries a gear 113, rigidly mounted thereon, and this gear engages a gear 114, rigidly mounted upon the shaft 1.

Means are provided for closing the welding circuit, including a sensitive switch 115, connected in the welding circuit including the wires 89. This switch includes a pivoted lever 116, carrying a roller 117. The roller is arranged to engage a cam 118, fixed upon the shaft 1. When the high point of the cam 118 engages the roller 117 it swings the lever 116 to close the switch 115 and its circuit. A welding current will then be applied to the contacting sleeve and wire. Any suitable form of welding circuit may be employed, and this circuit may embody any standard resistance or condenser discharge circuit.

The operation of the machine is as follows:

The continuous strand of wire 11 is paid out from a spool. Upon each rotation of the disc 52, the pawl 47 advances the ratchet-wheel 44 a step, and the rollers 39 and 43 will be turned a step. These rollers engage the wire 11 between them, and will feed the wire a step toward the turret 91. The wire is therefore fed a selected distance, which will determine the length of the tab. When the wire 11 is fed for its full stroke, its free end is arranged above and overlaps the sleeve S. When the wire is fed or pulled through the wire straightening device 17, it is straightened or deprived of any tendency that it would have to wind up or coil. The wire passes through the guide tube 24 and through the tubular guide 28. The turret 91 is turned a step, by the indexing means, and has a dwell, during each rotation of the shaft 1. The turret is turned quickly, and is brought to the dwell, before the leading end of the wire 11 moves in close relation to the turret. The sleeve is fed between the jaws 95' and 96, and the left end of the sleeve, viewed from Figure 7, projects beyond the end of the jaw 96. The pairs of jaws 95' and 96 are shown as spaced for 90°, for the purpose of illustration, and the turret is indexed so that each pair of jaws 95' and 96 is brought from the loading position adjacent to guides 106 and 107, to the welding position, adjacent to the stripper 108. When the sleeve is held stationary at the welding position, the wire is being fed toward the sleeve, and the leading end of the wire passes above and overlaps the sleeve S, Figure 7. While the wire 11 is being fed forwardly, the welding blades 86 and 86' are moving forwardly. The lower blade 86' passes beneath the sleeve, while the upper jaw 86 passes above the wire 11. The welding jaws 86 and 86' are resilient and biased open. When in the forward position, the point 87' is directly over the wire 11, Figure 6. When the lower jaw 86' moves forwardly, its free end engages the inclined face 98a of the arm 98, and will be raised thereby. When the welding jaws 86 and 86' are shifted to the forward or welding position they are brought to rest, and during this dwell, the cam 90 begins to depress the upper welding jaw 86, and this welding jaw is lowered and clamps the wire 11 to the sleeve. As soon as the leading end of the wire is clamped to the sleeve, the blades 67 and 68 move inwardly and sever the wire, and then move outwardly to disengage the same. As soon as the blades are retracted, the cam 118 shifts the lever 116, to close the welding circuit. During the welding period, the cam 90 continues to force the upper blade 86 downwardly, and the pressure follows through during the welding period. Further action of the cam 90 continues to depress the upper jaw, and both upper and lower jaws 86 and 86' now yield downwardly, the upper jaw 86 and sleeve S swinging the lower jaw 86' downwardly. The spring 100 is stiffer than the combined stiffness of the two jaws 86 and 86' but both jaws 86 and 86' and the spring 100 will yield, before the pressure is sufficient to collapse the sleeve S. The cam 90 releases the upper jaw 86, after the welding period, and the jaws 86 and 86' open, and the jaw 96 moves upwardly to again clamp the sleeve to the jaw 95'. The jaws 86 and 86' are then shifted rearwardly. The turret 91 is now indexed to bring the sleeve to the lowermost position, at which time the tail 98' engages the trip 101 and the jaw 96 is opened and the completed sleeve S having the tab welded thereto drops from the jaw 95' and passes through the opening 101' and is collected in a suitable receptacle. The cycle of operation is then repeated. Figure 10 shows the Geneva movement in the position that it assumes after the indexing of the turret and at the starting of the cycle of operation.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described our invention, what we claim is:

1. A machine for welding tabs to completed cathode sleeves for thermionic valves or the like, comprising a turret, devices carried by the turret for externally holding and supporting the completed cathode sleeves, means to index the turret to bring each sleeve to a welding position, means to bring a tab into overlapping relation to the exterior of each cathode sleeve when such sleeve is shifted to the welding position, means to press the tab and sleeve together and confining the pressure within limits which are incapable of collapsing the sleeve, and means to weld the tab to the sleeve, the pressing means causing the pressure to follow through during the welding period.

2. A machine for welding parts, comprising a turret having a jaw, a second jaw moveably mounted upon the turret for coaction with the first jaw for holding a part, resilient means to move the second jaw toward the first jaw, means to move a second part into overlapping relation to the first part, means to press the parts together in a direction toward the moveable jaw so that the pressing means causes the resilient means to yield after the parts are pressed together, and means to weld the parts together.

3. A machine for welding parts, comprising a support having a jaw provided with a recess, a moveable jaw mounted upon the support and coacting with the first jaw for holding a part between them, resilient means to shift the moveable jaw toward the first jaw, means to move a second part into overlapping relation to the first part, means to press the parts together in a direction toward the moveable jaw, and means to weld the parts together.

4. A machine for welding parts, comprising a rotatable turret having a plurality of spaced jaws, each jaw having a recess, a pivoted jaw mounted upon the turret and arranged near each of the first named jaws for holding a part between them, resilient means to move the pivoted jaw toward its coacting jaw, means to index the turret to bring the part to the welding position, means to move a second part into overlapping relation to the first part when such first part is moved to the welding position, means to press the parts together, and means to move each pivoted jaw to the open position when shifted to the discharge position.

5. A machine for welding tabs to cathode sleeves for thermionic valves, comprising means for holding the sleeve, means to move the tab into overlapping relation to the sleeve, yielding welding jaws insulated from each other and serving to engage the sleeve and tab, means to exert a pressure upon one jaw so that the jaws first clamp the tab to the sleeve and both jaws subsequently yield, and a welding circuit connected with the jaws.

6. A machine for welding tabs to cathode sleeves for thermionic valves, comprising means for holding a plurality of sleeves and advancing the same in succession to a welding position, means to move the tab into overlapping relation to the sleeve when advanced to the welding position, yielding welding jaws insulated from each other and serving to engage the sleeve and tab, means to exert a pressure upon one jaw so that the jaws first clamp the tab to the sleeve and both jaws subsequently yield, and a welding circuit connected with the jaws.

7. A machine for welding tabs to cathode sleeves for thermionic valves, comprising means for holding a plurality of sleeves and advancing them in succession to a welding position, means to move the tab into overlapping relation to the sleeve when advanced to the welding position, yielding welding jaws insulated from each other and serving to engage the sleeve and tab, means to move the yielding jaws toward and from the sleeve at the welding position, means to exert a pressure upon one jaw so that the jaws first clamp the tab to the sleeve and both jaws subsequently yield, said jaws being connected with a welding circuit.

8. A machine for welding tabs to cathode sleeves for thermionic valves, comprising a rotary turret having shoulders, moveable elements mounted upon the turret to press the sleeves against the shoulders, yielding means to move each element toward its shoulder, means to move a tab into overlapping relation to the sleeve, opposed yielding welding jaws insulated from each other and adapted to receive the sleeve and tab between them, one jaw engaging the movable element, means to exert pressure upon one jaw in a direction toward the element, and a welding circuit connected with the jaws.

9. A machine for welding tabs to a cathode sleeve for thermionic valves, comprising a rotary turret having a plurality of spaced shoulders, elements pivotally mounted upon the turret near the shoulders to press the sleeves against the shoulders, yielding means to move each element toward its shoulder, means to move a tab forming element axially of the turret and into overlapping relation to the sleeve held on the turret, a welding device including opposed spaced yielding welding jaws adapted to receive the tab forming element and sleeve between them, means to move the welding device radially of the turret, and means to move the jaws together.

10. A machine for welding tabs to cathode sleeves for thermionic valves, comprising a rotary turret having shoulders, means to impart an intermittent movement to the turret so that each shoulder is brought to a welding position, pivoted elements mounted upon the turret to press the sleeves against the shoulders, yielding means to move each pivoted element toward its shoulder, wire guide means extending axially of the turret, means to effect an intermittent movement of the wire held by the wire guide means, a carriage, means to move the carriage radially toward and from the turret, a welding device mounted upon the carriage including opposed spaced yielding welding jaws, one jaw being arranged to engage with the pivoted element, and an element acting upon one jaw to shift the same toward the other jaw and pivoted element.

11. A machine for welding tabs to cathode sleeves for thermionic valves, comprising a device for holding a plurality of sleeves and advancing the same in succession to a welding position, means to move a tab forming element into overlapping relation with the sleeve at the welding position, a bodily yieldable welding device, and means to operate the welding device so that it will clamp the tab forming element to the sleeve, the device yielding bodily to limit its degree of clamping action so that the sleeve will not be collapsed.

12. A machine for welding tabs to cathode sleeves for thermionic valves, comprising a rotary turret, means to index the turret, sleeve holding devices mounted upon the turret, a carriage arranged near the turret, means to move the carriage radially toward and from the turret, a welding device mounted upon the carriage including opposed welding jaws, a tab forming element guide means extending axially of the turret, and means to effect a feed of the tab forming element.

13. A machine for welding tabs to cathode sleeves for thermionic valves, comprising a rotary turret, sleeve holding devices carried by the turret, a main drive shaft, means driven by the main drive shaft to effect an intermittent turning movement of the turret, a carriage mounted to move generally radially toward and from the turret, a welding device mounted upon the carriage, means to reciprocate the carriage, a cam mounted upon the main drive shaft and operating the reciprocating means, a severing device mounted near the turret and including pivoted levers and blades carried by the levers, a cam mounted upon the main drive shaft to move the levers so that the blades sever the wire, a wire guide extending axially of the turret, feed means engaging the wire, and means driven by the main drive shaft to operate the feed means.

14. A machine for welding tabs to cathode sleeves for thermionic valves, comprising a rotary turret having a periphery provided with recesses and jaws, moveable jaws mounted upon the turret to coact with the first named jaws and disposed within the recesses and arranged within said periphery, means to close and open the moveable jaws, a feed table disposed upon one side of the turret, guide means mounted upon the feed table for receiving the sleeves and conducting the same between the pair of jaws adjacent to the table, a wiper disposed adjacent to the periphery of the turret and passing over the jaws and completing the feeding movement of the sleeve if necessary, means to index the turret so that each pair of jaws is moved to the welding position, means to feed a wire to the sleeve held at the welding position, and means to clamp the wire to the sleeve and weld the wire to the sleeve.

15. A machine for welding tabs to cathode sleeves for thermionic valves, comprising a rotary turret having a periphery provided with recesses and jaws, moveable jaws mounted upon the turret to coact with the first named jaws and disposed within the recesses and arranged within said periphery, means to close and open the moveable jaws, means to index the turret so that each pair of jaws is moved from the loading position to the welding position, a wiper disposed adjacent to the periphery of the turret and passing over the jaws and completing the feeding of the sleeve if necessary, means to feed a wire to the sleeve held at the welding position, and means to weld the wire to the sleeve at such welding position.

16. A machine for welding tabs to cathode sleeves for thermionic valves, comprising a rotary turret, sleeve holding devices mounted upon the turret, means to index the turret so that each device is shifted from the loading position to the welding position, wire guide means extending axially of the turret, elements receiving the wire between them and feeding the wire through the wire guide means to the holding device at the welding position, means to move the elements, a wire severing device arranged between the wire guide means and the turret, and means to weld the wire to the sleeve at the welding position.

17. A machine for welding tabs to cathode sleeves for thermionic valves, comprising a turret, sleeve holding devices carried by the turret, means to index the turret so that each device is moved from the loading position to a welding position, means to feed wire to the holding device at the welding position including a support, a roller mounted upon the support to engage one side of the wire, an arm pivoted upon the support, a roller mounted upon the arm to engage the opposite side of the wire, means to move the last named roller into engagement with the wire, gears secured to the rollers and engaging each other, a ratchet-wheel connected with one roller to turn it, a pivoted lever, a pawl carried by the pivoted lever to engage the ratchet-wheel, and means to operate the pawl, means to weld the wire to the sleeve at the welding position.

18. A machine for welding tabs to cathode sleeves for thermionic valves, wire straightening means to receive a continuous wire from a spool, a rotary turret, devices mounted upon the turret and externally holding the completed cathode sleeve, means to index the turret to bring each cathode sleeve to a welding position, means to feed the continuous wire longitudinally a step to the sleeve at the welding position, means to weld the wire to the sleeve at the welding position, and means to sever the wire.

19. A machine for welding tabs to cathode sleeves for thermionic valves, comprising a rotary turret, sleeve holding devices carried by the turret to move each holding device, means to index the turret from the loading position to the welding position, means to feed the wire to the sleeve at the welding position, resilient welding jaws arranged near and outwardly of the end of the turret and biased open and adapted to receive the sleeve and wire between them, means to shift the resilient jaws longitudinally and means to close the welding jaws.

20. A machine for welding tabs to cathode sleeves for thermionic valves, comprising means for externally holding and supporting a completed cathode sleeve, means for moving a tab forming element so that it overlaps the exterior of the completed cathode sleeve, and means to press the tab forming element inwardly against the sleeve and to weld such element to the sleeve.

21. A machine for welding tabs to cathode sleeves for thermionic valves, comprising means for externally holding and supporting a completed cathode sleeve, means for moving a tab forming element so that it overlaps the exterior of the completed cathode sleeve, means to press the tab forming element inwardly against the sleeve and to weld such element to the sleeve, and means to confine the pressure between the tab forming element and sleeve within the limits which are incapable of collapsing the sleeve.

22. A machine for welding tabs to cathode sleeves for thermionic valves, a rotary turret, devices carried by the rotary turret and arranged in spaced relation, each device externally engaging a cathode sleeve and holding the sleeve so that it extends axially of the turret and projects at one end beyond the turret, means for holding and moving a tab forming element so that it overlaps the projecting end of the sleeve, a pair of opposed resilient welding jaws, means to move the jaws longitudinally toward and from the turret, means to move one jaw toward the other jaw, and a welding circuit connected with the jaws.

23. A machine for welding tabs to cathode sleeves for thermionic valves, comprising a rotary turret, devices carried by the rotary turret and arranged in spaced relation, each device externally engaging a cathode sleeve and holding the sleeve so that it extends axially of the turret and projects at one end beyond the turret, means to index the turret so that each sleeve is brought to a welding position, means for holding and moving a tab forming element axially of the turret and arranging its end exteriorly of and overlapping the end of the sleeve at the welding position, a welding device comprising opposed resilient welding jaws which are biased open, means to move the welding device so that the jaws are moved longitudinally and transversely of the sleeve at the welding position for receiving the sleeve and element between them, and means to move one welding jaw laterally toward the other welding jaw.

24. A machine for welding tabs to cathode sleeves for thermionic valves, comprising a rotary turret, devices carried by the rotary turret and arranged in spaced relation, each device externally engaging a cathode sleeve and including a member yieldable in one direction, means to index the turret so that each sleeve is brought to a welding position, means for holding and moving a tab forming element for arranging a portion of the same exteriorly of and overlapping the sleeve at the welding position, a welding device comprising opposed resilient welding jaws which are biased open, means to move the welding device so that the jaws receive between them the sleeves and tab forming element, one jaw engaging the yieldable member when in the welding position, and means to apply pressure to the other jaw to shift the same laterally toward the jaw engaging the yieldable member, both welding jaws yielding as a unit when the yieldable member yields so that the pressure cannot collapse the sleeve.

25. A machine for welding tabs to cathode sleeves for thermionic valves, comprising a rotary turret, devices carried by the rotary turret and arranged in spaced relation, each device externally engaging a cathode sleeve and including a yieldable member, means to index the turret so that each sleeve is brought to a welding position, means to guide a continuous tab forming element toward the sleeve when the sleeve is in the welding position, intermittently operated means to engage the element and feed it longitudinally so that its end will overlap the outer face of the sleeve at the welding position, opposed resilient welding jaws which are biased open, means to move the welding jaws longitudinally so that they receive between them the sleeve and tab forming element, one jaw engaging the yieldable member, means to shift the other jaw laterally toward the yieldable member, and means for severing the continuous element between the intermittent movement thereof.

26. A machine for welding tabs to completed cathode sleeves for thermionic valves of the like, comprising a device for externally holding the completed cathode sleeve and advancing the same to a welding position, means to bring a tab into overlapping relation to the cathode sleeve when shifted to the welding position, and means to weld the tab to the cathode sleeve, said means including opposed resilient electrodes which are biased open, means to effect a relative movement between the electrodes and tab so that the electrodes the tab and cathode sleeve between them, and means to move one resilient electrode toward the other resilient electrode to press the tab against the sleeve, said electrodes being sufficiently flexible so that both electrodes will be flexed in the same direction by the moving means before the pressure that the electrodes exert upon the sleeve is sufficient to collapse the sleeve.

27. A machine for welding tabs to completed cathode sleeves for thermionic valves or the like, comprising a device for externally holding the completed cathode sleeve, means to bring a tab into overlapping relation to the cathode sleeve, and means to weld the tab to the cathode sleeve including opposed resilient electrodes, means to effect a relative shifting movement between the electrodes and cathode sleeve so that the electrodes receive the cathode sleeve and tab between them, and means to press one resilient electrode toward the other resilient electrode to press the tab against the cathode sleeve and to cause the cathode sleeve to be clamped between the resilient electrodes, said electrodes being sufficiently flexible so that both electrodes will be flexed in the same direction by the pressure means before the pressure that the electrodes exert upon the sleeve is sufficient to collapse the sleeve.

28. A machine for welding tabs to completed cathode sleeves for thermionic valves or the like, comprising a support having means for receiving and externally holding the completed cathode sleeve and leaving a part of the sleeve uncovered, means to guide the sleeve when shifted laterally into the holding means, means to bring a tab exteriorly of and into overlapping relation with the uncovered portion of the sleeve, and means to press the tab against the sleeve and to weld the tab to the sleeve and to confine the pressure within the limits which are incapable of collapsing the sleeve.

29. In a machine for welding tabs to completed cathode sleeves for thermionic valves or the like, opposed resilient electrodes which are biased open for receiving therebetween the sleeve and tab, and means to move one resilient electrode toward the other resilient electrode to press the tab against the sleeve, said electrodes being sufficient flexible so that both will be flexed in the same direction by the moving means before the pressure that the electrodes exert upon the sleeve is sufficient to collapse the sleeve.

ALBERT F. PITYO.
HARRY BUTTERFIELD.
SAMUEL W. WARNER.

REFERENCES CITED

The following references are of record in the file of this patent:

UNITED STATES PATENTS

| Number | Name | Date |
|---|---|---|
| 2,254,316 | Rider | Sept. 2, 1941 |
| 2,322,290 | Gabel | June 22, 1943 |
| 2,338,002 | Mero | Dec. 28, 1943 |